United States Patent [19]

Medvick et al.

[11] Patent Number: 4,596,272
[45] Date of Patent: Jun. 24, 1986

[54] COUPLING

[75] Inventors: Richard J. Medvick, Shaker Heights; Ross L. Wagner, Akron, both of Ohio

[73] Assignee: Swagelok Company, Hudson, Ohio

[21] Appl. No.: 583,747

[22] Filed: Feb. 27, 1984

[51] Int. Cl.[4] .............................................. F16L 29/00
[52] U.S. Cl. .......................... 137/614.03; 137/614.06; 251/149.9
[58] Field of Search ............. 137/614, 614.03, 614.06; 251/149.9; 285/316

[56] References Cited

U.S. PATENT DOCUMENTS

| 2,468,849 | 5/1949 | Trainor | 285/170 |
|---|---|---|---|
| 2,637,572 | 5/1953 | Bruce | 284/4 |
| 2,951,713 | 9/1960 | Hoffstrom | 137/614.03 |
| 3,039,794 | 6/1962 | de Lenzo | 137/614.03 |
| 3,113,588 | 12/1963 | Torres | 137/614.06 |
| 3,123,099 | 3/1964 | Breuning et al. | 137/614.06 |
| 3,211,178 | 10/1965 | Kiszko | 137/614.04 |
| 3,224,728 | 12/1965 | Buseth et al. | 251/149.6 |
| 3,435,848 | 4/1969 | Johnston | 285/316 X |
| 3,474,827 | 10/1969 | Torres | 137/614.06 |
| 3,613,726 | 10/1971 | Torres | 137/614.03 |
| 4,266,614 | 5/1981 | Fredd | 166/332 |
| 4,442,863 | 4/1984 | Magorien | 137/614.03 |

Primary Examiner—A. Michael Chambers
Assistant Examiner—John C. Fox
Attorney, Agent, or Firm—Fay, Sharpe, Fagan, Minnich & McKee

[57] ABSTRACT

A quick connect/disconnect coupling for carrying fluid under pressure includes cooperating body and stem coupling assemblies. The body coupling assembly includes an axially movable slide having a closed position engaging a body valve when the two coupling assemblies are disconnected, and having an open position spaced from the body valve when the two coupling assemblies are connected. Latch fingers attached to the slide cooperate with the stem coupling assembly for pulling the slide toward its closed position when the two coupling assemblies are disconnected. The body valve cooperable with the slide is mounted on one end portion of an elongated member having its opposite end portion threaded into a finned support member retained within the body between a shoulder and a snap ring. A poppet valve in the stem assembly has a hollow metal stamping forming a guide shaft received in a guide hole in an axially elongated guide sleeve on a finned guide member. A longitudinally movable sleeve cooperable with latch members has a button biased to a blocking position by a leaf type of spring for cooperation with an abutment to prevent movement of the sleeve, and the button is depressible to a clearance position for allowing movement of the sleeve.

12 Claims, 17 Drawing Figures

COUPLING

BACKGROUND OF THE INVENTION

This application relates to the art of couplings and, more particularly, to quick connect/disconnect couplings of the type disclosed in the commonly assigned U.S. patent application Ser. No. 459,150 filed Jan. 19, 1983, the disclosure of which is hereby incorporated herein by reference. Although the invention is particularly applicable to couplings of the type described and will be explained with specific reference thereto, it will be appreciated that certain features of the invention have broader aspects and may be used with other fittings or fluid containing devices such as control valves, check valves, unions, pipe or tube connectors, or the like.

One type of quick connect/disconnect coupling includes cooperating body and stem coupling assemblies. The body coupling assembly has an axially movable slide having a closed position engaging a body valve when the two coupling assemblies are disconnected, and having an open position spaced from the body valve when the two coupling assemblies are connected. The slide is normally biased toward its closed position by a coil spring so that the slide automatically closes when the two coupling assemblies are disconnected. However, such factors as dirt, wear and friction may prevent the slide from rapidly moving to its closed position, and this will cause leakage. Therefore, it would be desirable to have a positive means for initiating movement of the slide toward its closed position when the two coupling assemblies are disconnected.

A common body coupling assembly of the type described has a body valve attached to one end portion of an elongated member and has its opposite end portion attached to a finned support member. It would be desirable to have a simplified arrangement for attaching the elongated member to the finned support member and for holding the finned support member within the body member.

One stem coupling assembly of the type described has a poppet valve received therein for axial movement between closed and open positions. A guide member received in the stem has a hole receiving an elongated shaft cooperating with the poppet valve for guiding movement thereof. Previous arrangements have used an extremely long machined shaft for performing the guiding function, and it would be desirable to have a less expensive type of guiding arrangement.

The subject invention is deemed to meet the foregoing needs and others, and provides improved operating results for a coupling.

SUMMARY OF THE INVENTION

A body coupling assembly of the type described has latch fingers attached to the slide for cooperatively engaging the stem coupling assembly when the body and stem coupling assemblies are connected. Upon disconnection of the two assemblies, movement of such assemblies away from one another results in a pulling force on the latch fingers for initiating movement of the slide toward its closed position. A sleeve carried by the body coupling assembly cooperates with the latch fingers for providing movement of same inwardly and outwardly relative to the longitudinal axis along which the slide moves.

In a preferred arrangement, the latch fingers are attached to a ring member which, in turn, is attached to the slide. The latch fingers are normally biased outwardly, and have inwardly extending projections at their outer free end portions for cooperation with an external groove in the stem coupling assembly. The latch fingers have outwardly extending projections intermediate their inner and outer end portions for cooperation with an axially movable sleeve to provide inward and outward movement of the latch fingers.

The latch fingers on the slide also help to hold the two coupling assemblies in connected relationship. Additional latch members are also mounted on the body coupling itself for cooperation with the stem coupling assembly to hold the two coupling assemblies in connected relationship.

The body valve which cooperates with the slide is mounted on one end portion of an elongated member having its opposite end portion threaded into a finned support member which is retained in the body between an inwardly extending shoulder and a snap ring.

The stem coupling assembly includes a hollow stem member having large and small open end portions. A valve seat member is internally threaded into the large end portion, and an axially movable poppet valve is received within the assembled parts. A finned guide member is positioned within the hollow stem part against an inwardly extending shoulder and includes an elongated guide sleeve having a central guide hole therethrough. A guide shaft extending from the poppet valve into the guide hole in the guide sleeve comprises a hollow metal stamping having outwardly extending tabs on its end adjacent the poppet valve. A coil spring has one end acting on the tabs and its other end acting against the fins on the guide member for normally biasing the poppet valve to its closed position. The axial length of the guide sleeve from the fins to its free end is substantially greater than the axial dimension of the fins themselves. Having a long guide sleeve makes it possible to reduce the length of the guide shaft on the poppet valve. This eliminates the need to have the guide shaft extend axially into the small open end portion of the stem member, when the poppet valve is in the open position.

A longitudinally movable sleeve cooperates with latch members for selectively holding same in latched positions or providing movement of same to released positions. A stop button carried by the sleeve has a blocking position in which it cooperates with an abutment for preventing longitudinal movement of the sleeve. The button is depressible to a clearance position for clearing the abutment and allowing longitudinal movement of the sleeve. Leaf type spring means carried by the sleeve normally biases the button to its blocking position. The sleeve has an opening in which the button is received and a slot is spaced longitudinally from the opening. The leaf type spring means extends through the slot to underlie the button in biasing engagement therewith on one side of the slot and to engage an inner surface of the sleeve on the opposite side of the slot.

One advantage of the present invention is the provision of an improved arrangement for initiating movement of a slide toward its closed position in a quick connect/disconnect coupling assembly.

Another advantage of the invention resides in an improved type of latch finger for attachment to a slide in a coupling assembly.

Still another advantage of the invention is the provision of a quick connect/disconnect coupling assembly with latches on both the body and the slide for holding two coupling assemblies in connected relationship.

An additional advantage of the invention is found in an improved arrangement for mounting a body valve within the body of a body coupling assembly.

Yet another advantage of the invention is the provision of an improved arrangement for guiding a poppet valve during axial movement.

A further advantage of the invention is an improved mounting of a stop button on a longitudinally movable sleeve.

Other advantages and benefits of the invention will become apparent to those skilled in the art upon a reading and understanding of the following detailed description.

BRIEF DESCRIPTION OF THE DRAWINGS

The invention may take form in certain parts and arrangements of parts, a preferred embodiment of which will be described in detail in this specification and illustrated in the accompanying drawings which form a part hereof and wherein.

DESCRIPTION OF A PREFERRED EMBODIMENT

Figure 1:
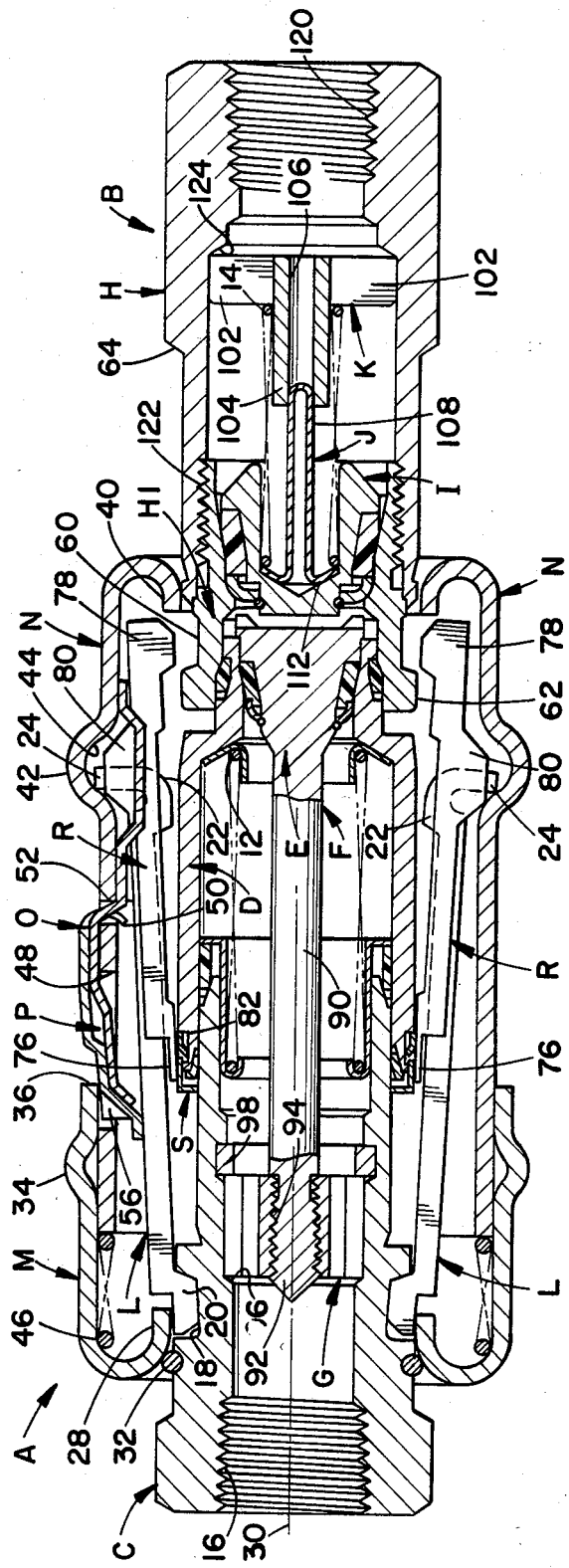
FIG. 1 is a longitudinal cross-sectional view showing the coupling of the present invention about to be connected or just after it has been disconnected.

Referring now to the drawings, wherein the showings are for purposes of illustrating a preferred embodiment of the invention only and not for purposes of limiting same, FIG. 1 shows a mating pair of body and stem coupling members or assemblies A and B respectively, in a position about to be connected upon movement axially toward one another.

Body assembly A includes a part or member C having a slide part D axially slidable thereon. Slide part D is normally biased to the right in FIG. 1 into engagement with a body valve E by means of a coil spring 12. Body valve E is the end portion of an elongated member or bolt F held centrally within the body part C by support fins G.

Stem assembly B includes cooperating stem parts or members H and H1 having a poppet I disposed therein and normally biased to the left in FIG. 1 into engagement with a seat adjacent an open end of the stem assembly by means of a coil spring 14. Spring 14 surrounds a guide shaft J extending through an opening in a guide member K against which the spring also acts.

Figure 2:
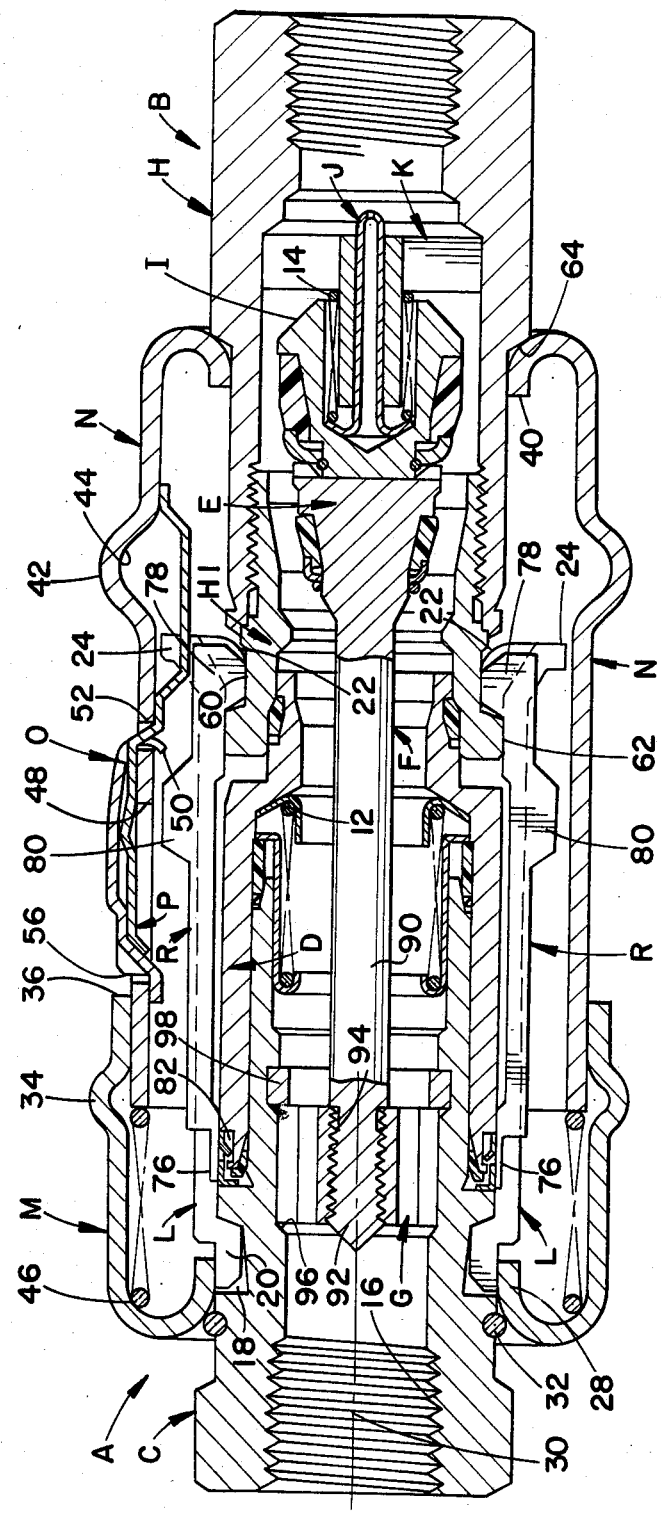
FIG. 2 is a view similar to FIG. 1 showing the coupling in its connected configuration.

When a mated pair of body and stem assemblies A, B are to be coupled, they are positioned as shown in FIG. 1. It will be noted that the outer end portion of stem member H1 engages the outer end portion of slide part D and, upon movement of assemblies A, B toward one another, slide part D retracts to the left in FIG. 1 out of engagement with body valve E. At the same time, body valve E enters the open end of stem member H1 and engages poppet I to move same away from its seat, ie., to the right in FIG. 1. Once the assemblies are connected, the parts are arranged as generally shown in FIG. 2 and fluid flow can take place through the connected assemblies.

Body part C is internally threaded as generally indicated at 16 for connection to another fluid conduit. Other interconnecting means could also be advantageously employed, however. An external circumferential groove 18 in the body part C loosely receives inwardly extending first end portions 20 of a plurality of latch members L. These latch members preferably comprise metal stampings, and have arcuate conformations in an end view. The opposite end portions of latch members L include inwardly extending latch hooks 22 and outwardly extending latch projections 24.

A generally cylindrical abutment sleeve M is positioned over body part C and has an outer end portion reversely curved inwardly as generally indicated at 28. Reversely curved end portion 28 has an axially extending portion overlaying axially extending portions of first end portions 20 of latch members L to loosely hold same within groove 18 for allowing swinging movement of the latch members opposite end portions toward and away from coupling longitudinal axis 30. A snap ring 32 received in a suitable external circumferential groove in body part C retains abutment sleeve M in position. Abutment sleeve M includes an outwardly extending circumferential bead 34 for stiffening same against deformation, and also includes a terminal end 36.

Operating means in the form of a generally cylindrical sleeve N surrounds latch members L and has an outer end portion reversely curved inwardly as generally indicated at 40. An outwardly extending circumferential bead 42 provides an inner circumferential recess 44 having a gradual slope to provide a cam surface for cooperation with latch projections 24. In the outward released position of latch members L as shown in FIG. 1, latch projections 24 are received in recess 44. This relationship also acts to retain opeating sleeve N against complete displacement to the right from body assembly A. The inner end portion of operating sleeve N is slidably received and guided within abutment sleeve M, and a coil spring 46 is positioned between the reversely curved outer end portion of abutment sleeve M and the inner terminal end of operating sleeve N for normally biasing operating sleeve N away from abutment sleeve M.

A generally rectangular opening 48 in operating sleeve N receives stop means in the form of stop button 0 having downwardly depending legs 50 freely received through a slot 52 spaced slightly from rectangular opening 48. A generally flat leaf type spring P normally biases the stop button upwardly in the view of FIG. 1. The outer surface of stop button 0 has a slow slope to prevent accidental depression of the button when contacted by an external object having relative movement generally toward abutment sleeve M. Stop button 0 also has an inner end 56 engageable with abutment sleeve inner end 36 to prevent further movement of operating sleeve N within abutment sleeve M to the left in FIG. 1 until stop button 0 is depressed for allowing button inner end 56 to pass beneath end 36 of the abutment sleeve.

Stem assembly B includes cooperating coupling means on stem member H1 in the form of a circumferential groove 60 for receiving latch hooks 22. With the components positioned as shown in FIG. 1, movement of body part C and stem member H1 toward one another causes slide D to retract to the left. At the same time, latch hooks 22 ride along the outer surface of slide D and an outer surface portion 62 of stem member H1 until latch hooks 22 reach groove 60. At this point, latch members L swing inwardly for reception of latch hooks 22 within groove 60. Spring 46, disposed between abutment sleeve M and operating sleeve N, biases operating sleeve N to the right in FIG. 1. This causes the cam surface portion of recess 44 to cooperate with latch projections 24 for urging latch hooks 22 into groove 60. This also releases operating sleeve N for movement to the right from the latch releasing position of FIG. 1 to the latch holding position of FIG. 2. In the latch holding position, the outer ends of latch projections 24 engage the inner cylindrical surface of operating sleeve N at a location spaced from recess 44 on the opposite side thereof from reversely curved outer end portion 40. Also, the outer end of reversely curved end portion 40 engages an abutment 64 on stem member H for holding operating sleeve N against further movement to the right in FIG. 2.

With the components connected as shown in FIG. 2, disconnection requires movement of operating sleeve N to the left until latch projections 24 are generally aligned with recess 44. However, axial movement of operating sleeve N to the left in FIG. 2 is prevented because terminal end 56 of stop button 0 engages terminal end 36 of the abutment means defined by abutment sleeve M. In order to free opeating sleeve N for movement to its releasing position, it is necessary to depress stop button 0 and hold same depressed while operating sleeve N is urged axially to the left so that stop button terminal end 56 will pass beneath abutment terminal end 36 as shown in FIG. 1. Thus, the latch means requires independent movements in two different directions for moving same to a releasing position. The movement of button 0 is generally toward and away from coupling longitudinal axis 30 with the motion being generally pivotal about button legs 50 in slot 52. Once recess 44 is generally aligned with latch projections 24, the biasing action of spring 12 urging slide D to the right is also urging stem members H and H1 to the right. The cooperating cam surfaces between latch hooks 22 and groove 60 cause the end portions of latch members L to be cammed generally radially outward for reception of latch projections 24 in recess 44. It is possible for slide D to stick in its open position with the biasing force of spring 12 insufficient to move same to its closed position. In that event, groove 60 and latch hooks 22 have cooperating cam surfaces which cause outward movement of the latches to position latch projections 24 in groove 44 when manual force is applied to separate body and stem coupling assemblies A, B. Poppet valve I will then close by engaging a seat on stem member H1 under the biasing force of spring 14. However, slide D may remain stuck in its open position and result in undesirable fluid leakage from body coupling assembly A.

Positive movement of slide D from its open position of FIG. 2 toward its closed position of FIG. 1 is achieved by attaching a plurality of fingers or latches R to slide part D for cooperation therewith in pulling the slide toward its closed position when body and stem coupling assemblies A, B are separated. Fingers or latches R and coil spring 12 define closing means for forceably moving slide part D toward its closed position.

Figure 4:
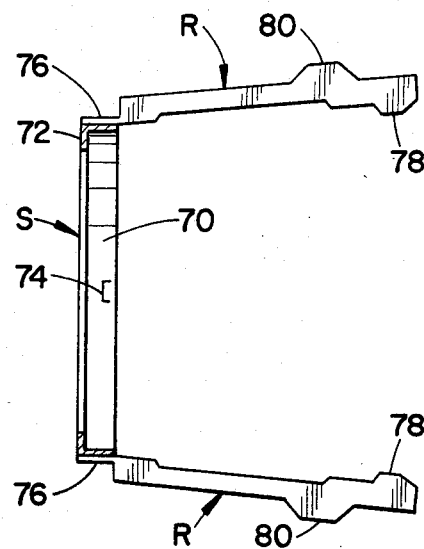
FIG. 4 is a cross-sectional view taken generally along lines 4—4 of FIG. 3.
Figure 3:
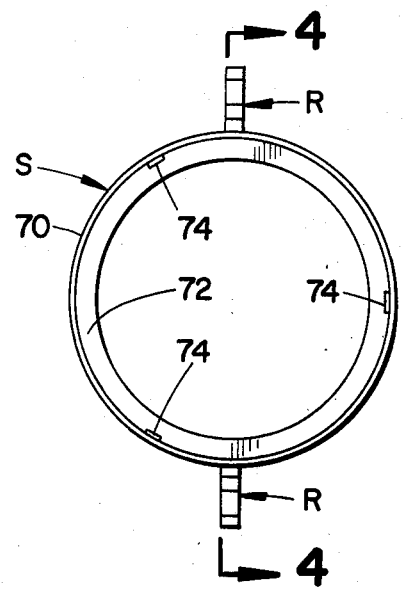
FIG. 3 is an end view of a latch finger assembly which is attached to the slide in the body coupling of FIGS. 1 and 2.

As shown in FIGS. 3 and 4, a ring member S has axial and radial flanges 70, 72, with axial flange 70 being provided with inwardly extending detents 74. Although there are three detents 74 shown spaced approximately 120° apart, it will be appreciated that different numbers of detents and different spacings can be provided. In the arrangement shown, a pair of fingers or latches R are spaced approximately 180° apart and out of alignment with detents 74.

Each finger R includes a thin, resilient inner end portion 76 which is welded or otherwise suitably secured to axial flange 70 of ring member S. The remainder of fingers R have a substantially greater radial thickness than inner end portions 76 so as to be substantially rigid. Inner end portions 76 are bent adjacent their intersections with the fingers proper so that the fingers extend outwardly from the longitudinal axis of the ring member at an angle of approximately 5°. The inner end portions of fingers R are resiliently bendable for radially inward finger movement from the position shown in FIGS. 3 and 4. Once the fingers are moved inwardly from the positions shown in FIGS. 3 and 4, they are resiliently biased radially outward under the influence of the bending stress in inner end portions 76.

The outer end portions of fingers R have inwardly extending projections or latch hooks 78 with sloping cam surfaces at the opposite ends thereof. Outwardly extending projections 80 are provided intermediate the inner and outer end portions of the fingers, and such projections are preferably located substantially closer to the finger outer end portions than to the inner end portions thereof. The opposite longitudinal ends of projections 80 are provided with sloping cam surfaces as shown in FIG. 4.

An external circumferential groove 82 is formed in slide part D adjacent the inner end portion thereof. Axial flange 70 on ring member S is closely received over the inner end portion of slide part D, and detents 74 snap into groove 82 for holding ring member S attached to slide D. When coupling assemblies A, B are connected as shown in FIG. 2, body latch hooks 22 and slide latch hooks 78 lie in a substantially common plane perpendicular to the longitudinal axis of slide part D, and are received in circumferential groove 60 in the stem assembly for holding coupling assemblies A, B connected.

In the position of FIG. 2 with slide D open, outwardly extending projections 24 and 80 on body latches L and slide fingers R are axially spaced from one another and out of alignment with internal groove 44 in sleeve N. Upon movement of sleeve N from the position of FIG. 2 to the position of FIG. 1 for disconnecting coupling assemblies A, B, inner circumferential groove 44 on sleeve is aligned with outwardly extending projections 24 on body latches L so that such latches can swing outwardly to the position shown in FIG. 1. However, at that time, outwardly extending projections 80 on slide fingers R are still axially spaced from groove 44 so that the fingers R are held in their latching position with the latch hooks 78 thereof received in groove 60. Separation of coupling assemblies A, B results in a pulling force on slide fingers R for pulling slide D toward its closed position and, when slide D substantially reaches its closed position engaging body valve E, outwardly extending projections 80 on the fingers will have moved into alignment with sleeve groove 44. This, then, allows slide fingers R to move outwardly to the position shown in FIG. 1 under the resilient bending force provided by inner end portions 76 thereof. Outward movement of slide fingers R disengages latch hooks 78 from groove 60 and allows complete separation of coupling assemblies A, B.

When slide fingers R are in the position of FIG. 2, ie., moved inwardly toward longitudinal axis 30, they are in an active position for providing a positive pulling force on slide part D to move same toward its closed position when the coupling assemblies are separated. Fingers R are movable outwardly away from longitudinal axis 30 to the inactive position shown in FIG. 1 in which outwardly extending latch projections 24, 80 on body latches L and fingers R are axially aligned with one another while latch hooks 22, 78 are axially spaced from one another. Thus, in the open position of slide D (FIG. 2), latch hooks 22, 78 are axially aligned with one another while latch projections 24, 80 are axially spaced from one another, and in the closed position of slide D (FIG. 1), latch projections 24, 80 are axially aligned with one another while latch hooks 22, 78 are axially spaced from one another.

Sufficient clearance is provided between body latches L to accommodate slide fingers R without interference. Cooperating cam surfaces between groove 60 and slide latch hooks 78 enhance outward movement of slide fingers R to their inactive position when coupling assemblies A, B are separated. Cooperating cam surfaces between slide latch projections 80 and groove 44 enhance inward movement of slide fingers R toward their active position when coupling assemblies A, B are connected. Movement of slide fingers R is under the control of the operating means defined by axially movable sleeve N. In one relative axial position between sleeve N and the fingers, sleeve N cooperates with latch projections 80 for holding the fingers in their active position. In another relative axial position between sleeve N and the fingers, radial outward movement of the fingers to their inactive position is provided by reception of latch projections 80 in groove 44.

When coupling assemblies A, B are positioned together for connection as shown in FIG. 1, slide latch hooks 78 first move into groove 60 as valve seat member H1 engages slide part D to move same to the left in FIG. 1 while the cooperating cam surfaces between projections 80 and groove 44 move the slide latches inwardly. Upon axial displacement of slide part D and latches or fingers R to the left a sufficient distance to axially align latch hooks 22, 78, latch hooks 22 also move into groove 60.

With the coupling assemblies connected as shown in FIG. 2, separation of the parts first results in body latches L swinging outwardly with projections 24 received in groove 44. However, slide latch hooks 78 remain connected with groove 60 until slide D and slide latches or fingers R have moved axially to the right in FIG. 2 a sufficient distance for axially aligning slide latch projections 80 with groove 44 and body latch projections 24. At that time, slide fingers R also swing outwardly to allow complete separation of the coupling assemblies.

As shown in FIGS. 1 and 2, body valve member E is one end portion of an elongated member 90 having an externally threaded opposite end portion 92 received in an internally threaded hole 94 in finned support member G. Finned support member G is retained within hollow body member C between an inwardly extending shoulder 96 and a snap ring 98 received in a suitable circumferential groove in body member C. Snap ring 98 is located intermediate shoulder 96 and body valve E.

Figure 5:
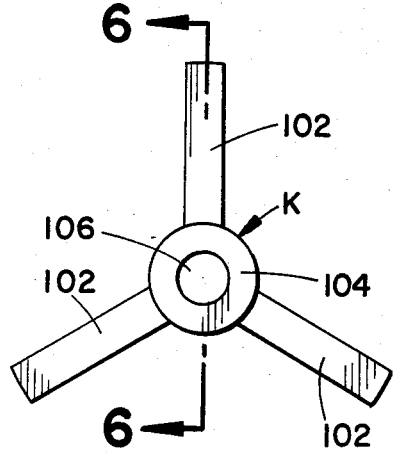
FIG. 5 is an end view of a poppet valve guide member which is received in the stem assembly of FIGS. 1 and 2.
Figure 6:
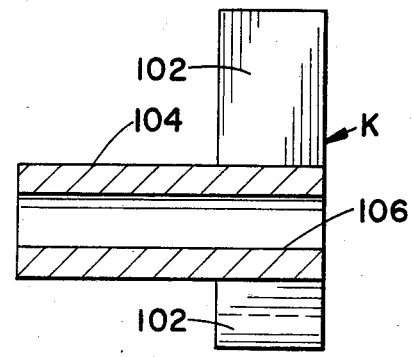
FIG. 6 is a cross-sectional view taken generally along lines 6—6 of FIG. 5.

FIGS. 5 and 6 show finned guide member K as having a plurality of circumferentially spaced radial fins 102 extending outwardly from a cylindrical guide sleeve 104 having an axial hole 106 therethrough. The axial length of guide sleeve 104 from fins 102 to the free end of the guide sleeve is substantially greater than the axial dimension of fins 102. While guide member K may suitably be manufactured by a variety of conventional methods, powdered metal techniques may prove particularly desirable.

Figure 8:
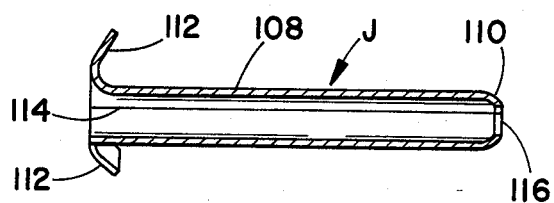
FIG. 8 is a cross-sectional view taken generally along lines 8—8 of FIG. 7.
Figure 7:
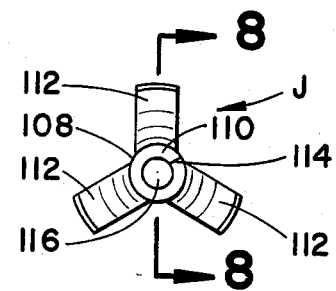
FIG. 7 is an end view of a poppet valve guide shaft member used in the stem assembly of FIGS. 1 and 2.

FIGS. 7 and 8 show an elongated hollow guide shaft member J having an elongated and hollow cylindrical guide shaft 108 with a slightly rounded terminal end 110 and tab means in the form of three outwardly extending rectangular tabs 112 circumferentially spaced equidistantly from one another at the opposite end thereof. Tabs 112 are slightly reversely curved back toward rounded end 110. Guide member J can be stamped from flat metal stock and, as shown in FIG. 8, has a longitudinal seam 114 extending along guide shaft 108. Also, the seam intersects rounded end 110 at a central hole 116 and intersects the opposite end between two adjacent tabs 112.

The axial length of hollow guide shaft 108 is at least approximately the same length as the total axial length of hole 106 in guide sleeve 104 of guide member K. Guide shaft 108 is received in guide sleeve hole 106 for guiding axial movement of poppet valve I. Coil spring 14 surrounds guide sleeve 104 and guide shaft 108, and has one end bearing against fins 102 and an opposite end bearing against guide member tabs 112.

Stem member H (FIGS. 1 and 2) is in the form of a hollow body having internally threaded small and large end portions 120, 122. An inwardly extending shoulder 124 is provided closer to small end portion 120 than large end portion 122 and faces toward large end portion 122. Valve seat member H1 is externally threaded and is received within large end portion 122. This arrangement simplifies assembly of the poppet valve and makes it possible to use different types of adaptors in small end 120.

Figures 9, 11:
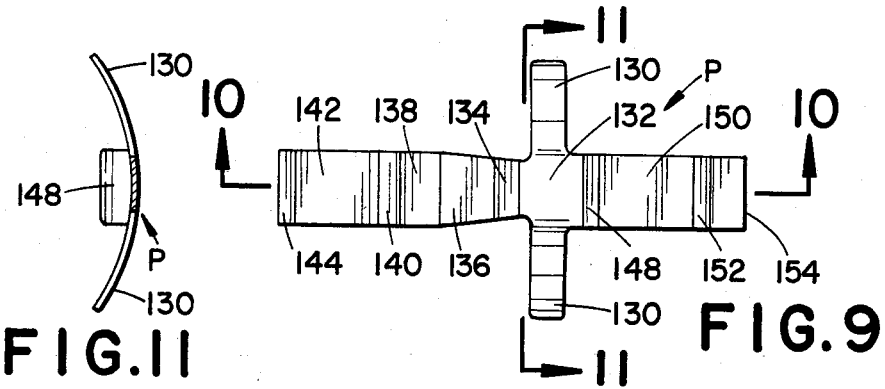
FIG. 9 is a plan view of the leaf spring used to urge the stop button associated with the operating sleeve in an outward direction.
FIG. 11 is a cross-sectional view taken along lines 11—11 of FIG. 9.
Figure 10:
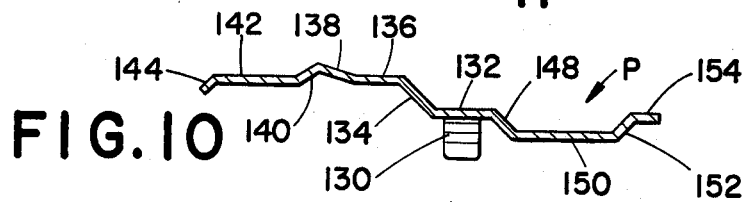
FIG. 10 is a cross-sectional view taken along lines 10—10 of FIG. 9.

FIGS. 9–11 show leaf type spring means P stamped from a flat strip of stainless steel. Opposite wings 130 extend outwardly from a flat area 132 and are curved to generally the same curvature as the inner surface of operating sleeve N. A slot penetrating portion 134 slopes upwardly to the left from flat area 132, and merges into a generally flat and slightly upwardly inclined portion 136 which in turn merges into an upwardly inclined portion 138. An inclined portion 140 extends downwardly to the left from upwardly inclined portion 138 and merges into another generally flat slightly upwardly inclined portion 142 which terminates in downwardly bent end portion 144. An inclined portion 148 extends downwardly to the right from flat area 132 and merges into another generally flat area 150 which connects to upwardly inclined portion 152 terminating in flat end portion 154. Inclined portion 134 has a narrower width than the remainder of spring P and diverges outwardly along generally flat area 136.

Figure 12:
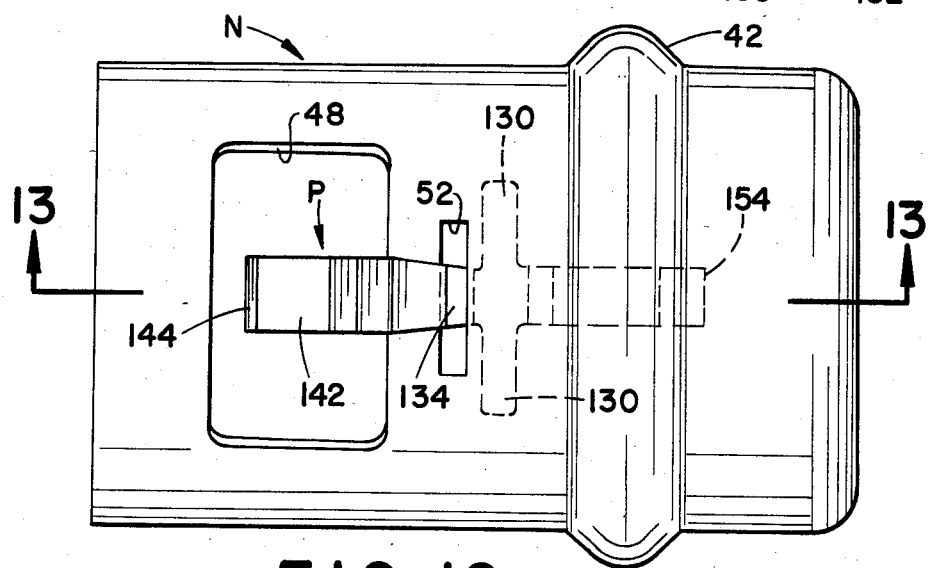
FIG. 12 is a plan view of the leaf spring shown in FIG. 9 installed on the operating sleeve.
Figure 13:
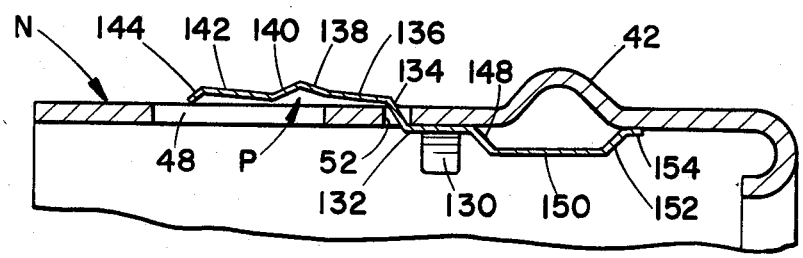
FIG. 13 is a cross-sectional view taken along lines 13—13 of FIG. 12.
Figure 14:
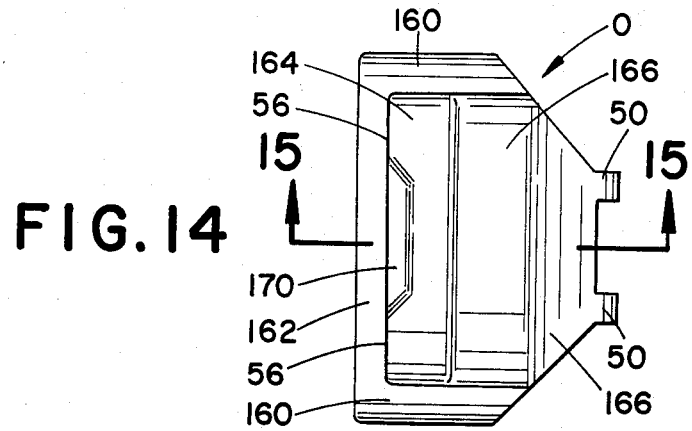
FIG. 14 is a plan view of the stop button used in association with the operating sleeve.

Spring P is positioned on operating sleeve N as shown in FIGS. 12 and 13. All parts of spring P to the right of slot 52 and inclined portion 134 are inside of sleeve N, while all parts of spring P to the left of slot 52 and inclined portion 134 are outside of sleeve N. Flat area 132, wings 130 and flat end portion 154 engage the inner surface of sleeve N. Wings 130 provide stability by resisting angling of spring P and maintain same generally parallel to the longitudinal axis of operating sleeve N. Flat end portion 154 is on the opposite side of bead 42 and groove 44 from slot 52. Inclined portions 148, 152 connected by flat portion 150 provide spring action.

Generally flat portion 136 is adapted to engage the outer surface of sleeve N between slot 52 and opening 48. Inclined portions 138, 142 allow downward resilient bending, while inclined portion 140 allows some yielding to the right of portion 142. The width of inclined portion 134 is substantially less than the width of slot 52, and the length of the spring is such that portion 142 and end portion 144 can be depressed through opening 48.

Referring to FIGS. 14–17, stop button 0 is inserted into opening 48 from within sleeve N, and has opposite side peripheral areas 160 and rear peripheral area 162 which engage the inner surface of sleeve N adjacent opening 48. Stop button 0 has raised areas 164, 166, with area 166 being higher than area 164. End portions 56 of raised area 164 adjacent rear peripheral area 162 are engageable with inner end 36 of abutment sleeve M to block longitudinal movement of sleeve N to the left in FIGS. 1 and 2 to thereby hold latch members L in their latched positions.

Figure 15:
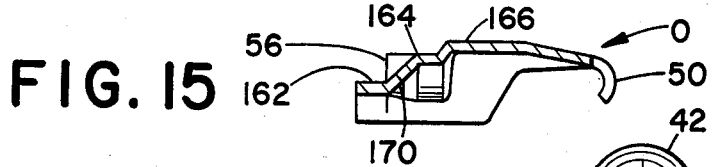
FIG. 15 is a cross-sectional view taken along lines 15-15 of FIG. 14.
Figure 16:
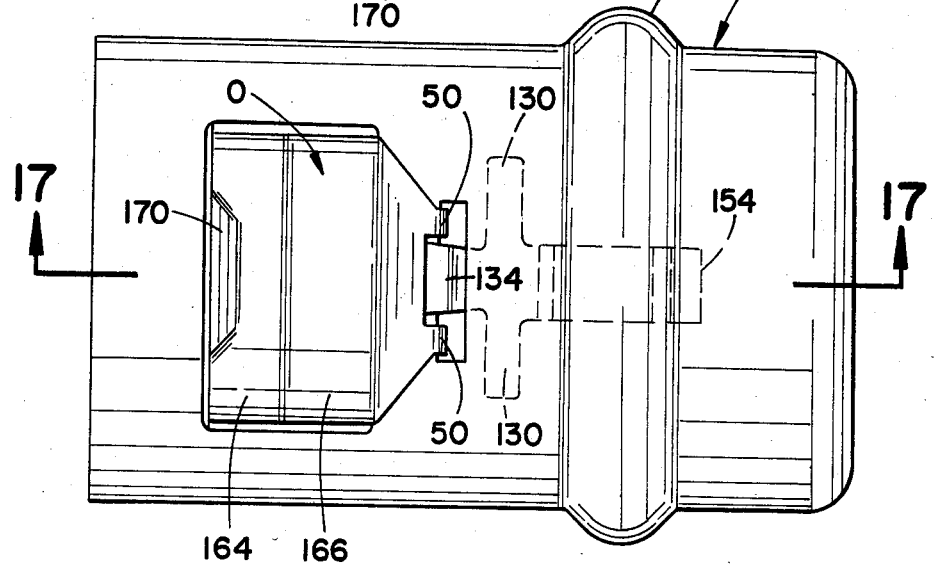
FIG. 16 is a plan view of the stop button as mounted in the operating sleeve in cooperative association with the leaf spring; and, FIG. 17 is a cross-sectional view taken along lines 17—17 of FIG. 16.
Figure 17:
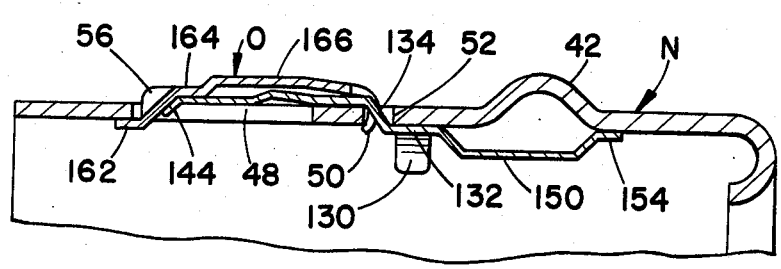

A button shoulder 170 is inclined upwardly to the right from rear peripheral area 162 into raised area 164 between end portions 56. Raised area 166 terminates in a pair of laterally spaced legs or button hooks 50 which extend downwardly from area 166 and are bent slightly back to the left as shown in FIG. 15. Button legs or hooks 50 extend through slot 52 and are positioned on opposite sides of spring inclined portion 134. Spring end portion 144 engages button shoulder 170 to bias button 0 to the left so that hooks or legs 50 firmly engage the edge of slot 52. Spring portions 138, 140 and 142, which underlie button 0, are also under downward bending stress so that button 0 is normally biased upwardly to a blocking position in which button end portions 56 will engage abutment 36 to prevent movement of operating sleeve N to the left. Manual depression of button 0 to a clearance position against the biasing force of spring P allows button end portions 56 and raised area 164 to pass beneath abutment 36 so that sleeve N and button 0 can move to the left and allow movement of latch members L to their released positions by alignment of sleeve groove 44 with latch member projections 24.

The invention has been described with reference to the preferred embodiment. Obviously, modifications and alterations will occur to others upon a reading and understanding of the foregoing detailed written description. It is intended to include all such modifications and alterations insofar as they come within the scope of the appended claims or equivalents thereof.

Having thus described the invention, it is now claimed:

1. A coupling member for a quick connect/disconnect coupling comprising:
an elongated hollow body having a longitudinal axis and a valve internally supported therein against axial movement relative thereto; a slide supported by said body for axial movement between a closed position engaging said valve and an open position axially displaced from said valve; slide closing means for moving said slide toward said closed position and including elongated fingers having first end portions cooperatively attached to said slide and free outer end portions engageable with a cooperating coupling member, said fingers diverging outwardly in a direction from said first end portions toward said outer end portions in said closed position of said slide, said fingers being moved inwardly toward said axis in said open position of said slide; latch means carried by said body for connecting said coupling member to the cooperating coupling member, said latch means having a hook portion directly engageable with the cooperating coupling member, axially movable sleeve means carried by said body outwardly of said fingers and siad latch means in cooperative relationship therewith for providing movement of said fingers and said hook portion inwardly and outwardly relative to said axis, said sleeve means being axially movable on said body independently of and relative to said slide; and, said sleeve means being in one axial position on said body when said slide is in said open position and being in a different axial position on said body when said slide is in said closed position.

2. The coupling member as defined in claim 1 wherein said first end portions of said fingers are attached to a ring member which in turn is attached to said 3. The coupling member as defined in claim 1 including outwardly extending projection on said fingers intermediate said inner and outer end portions for cooperation with said sleeve means.

4. A coupling member for a quick connect/disconnect coupling comprising:
an elongated hollow body having a longitudinal axis and a valve internally supported therein against axial movement relative thereto; a slide supported by said body for axial movement between a closed position engaging said valve and an open position axially displaced from said valve; first and second latch means respectively carried by said body and said slide and respectively having first and second latch hooks directly engageable with a cooperating coupling member for releasably connecting said coupling member with the cooperating coupling member by engagement of both said first and second latch hooks with the cooperating coupling member, said latch hooks being movable inwardly and outwardly between inward latched positions and outward unlatched positions; and, said latch means carried by said body being substantially fixed against axial movement relative to said body and said latch means carried by said slide being substantially fixed against axial movement relative to said slide.

5. The coupling member as defined in claim 4 wherein said first and second latch means comprises a plurality of elongated latch members having free outer end portions swingable toward and away from said axis between said latched and unlatched positions.

6. The coupling member as defined in claim 4 including movable operating means carried by said body for cooperation with said latch means for moving same to said latched positions and providing movement of same to said unlatched positions.

7. The coupling member as defined in claim 6 wherein said operating means is operative to provide movement of said latch means carried by said body to said unlatched position prior to movement of said latch means carried by slide to said unlatched position.

8. A coupling member for a quick connect/disconnect coupling comprising:

an elongated hollow body having a longitudinal axis and a valve internally supported therein against axial movement relative thereto; a slide supported by said body for axial movement between a closed position engaging said valve and an open position axially displaced from said valve; slide closing means for moving said slide toward said closed position and including elongated fingers having first end portions cooperatively attached to said slide and free outer end portions, said fingers diverging outwardly in a direction from said first end portions toward said outer end portions said closed position of said slide, said fingers being moved inwardly toward said axis in said open position of said slide; outwardly extending projections on said fingers intermediate said inner and outer end portions, said outwardly extending projections including cam surfaces on at least the ends thereof closest to said inner end portions, said cam surfaces being sloped outwardly in a direction from said inner end portions toward said outer end portions; latch means carried by said body for connecting said coupling member to a cooperating coupling member, said latch means having radially movable portions directly engageable with the cooperating coupling member; and, axially movable sleeve means carried by said body outwardly of said fingers and said latch means in cooperative relationship with said outwardly extending projections and said latch means for providing movement of said fingers and said radially movable portions of said latch means inwardly and outwardly relative to said axis.

9. A coupling member for a quick connect/disconnect coupling comprising:

an elongated hollow body having a longitudinal axis and a valve internally supported therein against axial movement relative thereto; a slide supported by said body for axial movement between a closed position engaging said valve and an open position axially displaced from said valve; first and second latch means respectively carried by said body and said slide for releasably connecting said coupling member with a cooperating coupling member, said first and second latch means comprising a plurality of elongated latch members having free outer end portions swingable toward and away from said axis between latched and unlatched positions; and, an outer sleeve carried by said body for axial movement relative thereto and cooperative with said latch members for moving same to said latched positions and for providing movement of same to said unlatched positions.

10. The coupling member as defined in claim 9 wherein said sleeve is operative to provide movement of said latch members carried by said body to said unlatched position prior to movement of said latch members carried by said sleeve to said unlatched position.

11. A coupling member for a quick connect/disconnect coupling comprising:

an elongated hollow body having a longitudinal axis and a valve internally supported therein against axial movement relative thereto; a slide supported by said body for axial movement between a closed position engaging said valve and an open position axially displaced from said valve; first and second latch means respectively carried by said body and said slide for releasably connecting said coupling member with a coopeating coupling member, said latch means being movable between latched and unlatched positions, said latch means including outer end portions having inwardly extending latch hooks thereon, said latch means carried by both said body and slide having said latch hooks substantially axaially aligned in said latched positions thereof; and, said latch hooks on said latch means carried by said body being axially displaced from said latch hooks carried by said slide in said unlatched positions of said latch means.

12. A coupling member for a quick connect/disconnect coupling comprising:

an elongated hollow body having a longitudinal axis and a valve internally supported therein against axial movement relative thereto; a slide supported by said body for axial movement between a closed position engaging said valve and an open position axially displaced from said valve; first and second latch means respectively carried by said body and said slide for releasably connecting said coupling member with a cooperating coupling member, said latch means being movable between latched and unlatched positions, said latch means including outwardly extending latch projections thereon, said latch means carried by both said body and slide having said latch projections substantially axially aligned in said unlatched positions thereof; and, said latch projections on said latch means carried by said body being axially displaced from said latch projections carried by said slide in said latched positions of said latch means.

* * * * *